Aug. 9, 1966   JEAN-PIERRE FREYTAG ETAL   3,265,495
METHOD OF MANUFACTURING CATHODES
Filed Jan. 26, 1962

INVENTORS
J.P. FREYTAG & A.M. SHROFF

BY Paul M. Craig, Jr.
ATTORNEY 3,265,495
METHOD OF MANUFACTURING CATHODES

Jean-Pierre Freytag and Arvind M. Shroff, Paris, France, assignors to CSF-Compagnie Generale de Telegraphie Sans Fil, Paris, France
Filed Jan. 26, 1962, Ser. No. 169,021
Claims priority, application France, Feb. 7, 1961, 851,902
6 Claims. (Cl. 75—208)

The present invention relates to methods of manufacturing impregnated-type cathodes, that is, cathodes comprising a porous tablet of metal, such as tungsten, molybdenum or rhenium, impregnated with an alkaline-earth metal salt such as barium or calcium aluminate this tablet being heated during operation by the heat emitted by a filament.

According to the present invention, a cathode provided with a porous tablet is manufactured by applying the refractory powder onto a support by a method such as coating, spraying or compressing at low pressure, thereupon proceeding to a first sintering operation at a relatively reduced temperature, this first sintering operation, on the one hand, fixing or securing the powder to the support, and on the other, bringing the same to a relatively reduced state of consistence, thereupon effecting the machining operations on this relatively little consistent body, thereafter proceeding to a second sintering operation at a relatively high temperature as normally utilized to bring the porous body to its final consistence, and finally impregnating this body with an alkaline-earth salt within a neutral or reducing atmosphere.

In the case in which the refractory powder is applied by coating, there may be utilized the suspension of this powder in ethyl acetate, for example, in the proportions of 90 cm.$^3$ of ethyl acetate for 150 grams of tungsten.

In the case in which the refractory powder is applied by spraying, the preceding suspension may be used though in diluted form. Eventually, there may be added a small proportion of collodion, a syrupy solution of nitrocellulose in a mixture of alcohol with three times its volume in ether to improve the adherence of the grains.

In the case in which the refractory powder is applied by compression under small pressure, there may be used, depending on the form of the cathode, either dry grains or a mixture containing a small amount of ethyl acetate.

The temperature ranges suitable for the sintering operations are from 1200° C. to 1600° C. for the first sintering step and from 1700° C. to 2400° C. for the second sintering step, depending on the porosity which one desires to obtain. Curves expressing the relative density in percent of the density of the compact metal as a function of the sintering temperature or various refractory powders can be found in most reference manuals on powder metallurgy, such as, Principles of Powder Metallurgy by W. D. Jones, London, 1937.

The support onto which is secured the powder may be constituted either by a box made of refractory metal such as molybdenum provided in the cathodes having a reservoir for accommodating therein the porous tablets, or by an insulating tube, for example, made of alumina surrounding the filament, or directly by the bare wire of the filament which permits a direct heating of the tablet.

The machining operation of operations between the two sintering steps which will take place on a mass of grains that adhere together very little but are supported by a rigid metallic or insulating support will generally be reduced to a simple scraping operation by means of a metallic tool performed at ambient temperature.

In the known methods of manufacture of these cathodes, the porous tablet subjected to a very high compression was sintered up to its normal hard consistence and was machined prior to its introduction into the metal box to which it was secured by brazing or electric soldering to improve the thermal contact between the tablet and the support. The machining work, made on this tablet according to the prior art, therefore ran the risk of obstructing or closing the pores. In order to avoid such obstruction, it was known heretofore, prior to the machining operation, to fill the pores with a "lubricant," for example, with molten copper of which the soldification imparted to the body the internal indeformability preventing the destruction of the pores by the work tool. However, it was thereafter necessary in the prior art to eliminate the lubricant subsequent to the machining operation by causing the same to evaporate. This latter operation was relatively lengthy and its complete success was never certain whence the divergences between the emissive properties of the cathodes. The invention avoids the use of this lubricant without incurring any danger whatsoever of obstruction of the pores; for the machining operation reduced to a simple scraping operation of a relatively soft substance cannot cause such an obstruction.

With the known methods of the prior art, the preparation of the tablet necessitated the utilization of a press with a very large force, for example, of the order of 100 tons, whereas the present invention has recourse, if any, only to very slight compacting pressures of less than 20 kg./cm.$^2$ prior to the first sintering step, and therefore necessitates only much less significant presses.

In the known methods of the prior art, the porous tablet, accommodated in a box to which it was secured by brazing or soldering necessitated securing operations which presented the danger of soiling the cathode surface and deteriorating its emissive properties. The present invention eliminates radically these inconveniences, and more generally permits elimination of the box since the support may be constituted simply by the heater wire or by its insulation.

Finally, the application of the present invention permits the realization of much more porous tablets than normally obtainable. According to the present invention, the coefficient of porosity realized may be of 45% and thereabove.

Accordingly, it is an object of the present invention to provide a method of manufacturing impregnated-type cathodes which eliminates the inadequacies and shortcomings encountered with the prior art methods.

It is another object of the present invention to provide a manufacturing method for impregnated-type cathodes in which the machining operations are greatly simplified without danger to any obstruction to the porous structure of the emissive cathode portion.

Still another object of the present invention resides in the provision of a method of manufacturing a porous tablet for cathodes in which the porous structure is maintained without the use of special lubricants nothwithstanding machining operations performed on the tablet.

A still further object of the present invention resides in the method of manufacture of a cathode which requires installations that are far less costly and complicated, and in particular which does not require large presses providing pressure forces as is necessitated with analogous methods of the prior art.

A further object of the present invention resides in the provision of a method for manufacturing cathodes which prevents soiling of the cathode surfaces as well as deterioration of the emissive properties thereof while at the same time assuring uniformity among emissive surfaces.

Still a further object of the present invention resides in the provision of a cathode structure of the impregnated type which is provided with a tablet that has a coefficient of porosity much greater than that obtainable in the prior art.

These and other objects, features and advantages of the present invention will become more obvious from the following description when taken in connection with the accompanying drawing which shows, for purposes of illustration only, several embodiments in accordance with the present invention, and wherein FIGURE 1 is a cross sectional view through a first embodiment of a cathode structure in accordance with the present invention;

Figure 1:
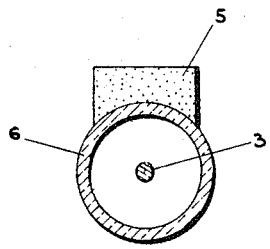

Referring now to the drawing wherein like reference numerals are used throughout the various views to designate like parts, and more particularly to FIGURE 1, reference numeral 6 designates therein a tubular member of alumina in which is accommodated the heating filament 3. The tubular member 6 is used as support for the porous body 5 made in accordance with the present invention and impregnated with barium aluminate according to well known conventional techniques such as described in detail in U.S. Patent 2,700,000.

Figure 2:
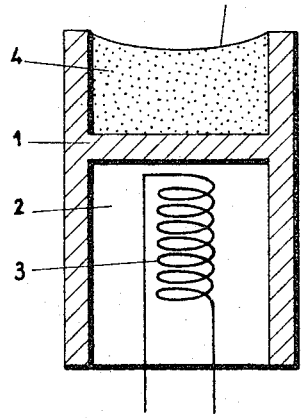
FIGURE 2 is a cross sectional view through a modified embodiment of a cathode structure in accordance with the present invention.

FIGURE 2 illustrates a modified embodiment in accordance with the present invention in which a box 1 of molybdenum is provided with a cavity 2 in which is accommodated the filament 3. Additionally, the box 1 is provided with a cupel 4 filled with the porous body 5 made of tungsten treated according to the present invention and corresponding to the element designated in FIGURE 1 by the same reference numeral.

Figures 3, 4, 5:
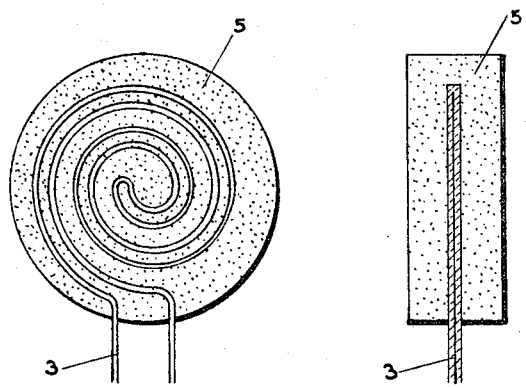
FIGURE 3 is a plan view of a still further modified embodiment of the cathode structure in accordance with the present invention.
FIGURE 4 is a transverse cross sectional view of the cathode structure of FIGURE 3.
FIGURE 5 is an elevational view of still another modified embodiment of a cathode structure in accordance with the present invention.

FIGURES 3 and 4 illustrate in plain and transverse cross sectional view a still further modified embodiment according to the present invention in which a tungsten wire that is insulated is wound in the form of a double spiral and forms the filament 3. The portion of the wire wound in spiral form serves as support for the porous body 5 which is of pancake form and made in accordance with the present invention. The filament is thus embedded within the tablet itself which is heated by conduction.

In FIGURE 5, the porous body is no longer of pancake shape but is a simple cylindrical coating or enclosure of the bare tungsten wire 3 which may be itself rectilinear or wound in spiral form or bent in any known desired manner to thereby provide a cathode with direct heating.

While we have shown and described several embodiments in accordance with the present invention, it is understood that the same is not limited thereto, but is susceptible of many changes and modifications within the spirit and scope thereof. For example, the method according to the present invention may be used for producing any desired shape of a cathode of the type described hereinabove. Thus, it is obvious that the present invention is susceptible of many changes and modifications within the spirit and scope thereof, and we therefore do not wish to be limited to the details shown and described herein, but intend to cover all such changes and modifications as are encompassed by the scope of the appended claims.

We claim:

1. A method of manufacturing impregnated-type cathodes having a body of porous metal, comprising the steps of depositing refractory metal powder substantially in the absence of compression on a support, pre-sintering the thus deposited refractory metal powder at relatively low temperature in the range of between 1200° C. and 1600° C., machining said pre-sintered powder to form the desired shape of said body, re-sintering the body at a relatively high temperature in the range of between 1700° C. and 2400° C., and impregnating the body with an alkaline-earth salt under predetermined ambient conditions operative for such impregnation.

2. A method of manufacturing impregnated-type cathodes having a body of porous metal, comprising the steps of depositing refractory metal powder substantially in the absence of compression on a box-shaped support made of refractory metal, pre-sintering the thus deposited refractory metal powder at relatively low temperature in the range of between 1200 degrees C. and 1600 degrees C., machining said pre-sintered powder to form the desired shape of said body, re-sintering the body at a relatively high temperature, in the range of between 1700 degrees C. and 2400 degrees C., and impregnating the body with an alkaline-earth salt under predetermined ambient conditions operative for such impregnation.

3. A method of manufacturing impregnated-type cathodes having an insulated heater, a body of porous metal and a support therefor, comprising the steps of depositing refractory metal powder substantially in the absence of compression on said support constituted by the insulation of the heater of the cathode, pre-sintering the thus deposited refractory metal powder at relatively low temperature in the range of between 1200 degrees C. and 1600 degrees C., machining said pre-sintered powder to form the desired shape of said body, re-sintering the body at a relatively high temperature in the range of between 1700 degrees C. and 2400 degrees C., and impregnating the body with an alkaline-earth salt under predetermined ambient conditions operative for such impregnation.

4. A method manufacturing impregnated-type cathodes having a bare wire heater, a body of porous metal and a support therefor, comprising the steps of depositing refractory metal powder substantially in the absence of compression on said support constituted by the bare wire heater for directly heating the cathode, pre-sintering the thus deposited refractory metal powder at relatively low temperature in the range of between 1200 degrees C. and 1600 degrees C., machining said pre-sintered powder to form the desired shape of said body, re-sintering the body at a relatively high temperature in the range of between 1700 degrees C. and 2400 degrees C., and impregnating the body with an alkaline-earth salt under predetermined ambient conditions operative for such impregnation.

5. A method of manufacturing impregnated-type cathodes having a body of porous metal and a support therefor, comprising the steps of depositing refractory metal powder substantially in the absence of compression on said support constituted by a body of cylindrical shape, the body of porous metal being of parallelepipedic shape adhering to the surface of said support, pre-sintering the thus deposited refractory metal powder at relatively low temperature in the range of between 1200 degrees C. and 1600 degrees C., machining said pre-sintered powder to form the desired shape of said body, re-sintering the body at a relatively high temperature in the range of between 1700 degrees C. and 2400 degrees C., and impregnating the body with an alkaline-earth salt under predetermined ambient conditions operative for such impregnation.

6. A method of manufacturing substantially without compression, impregnated-type cathodes having a body of porous metal and a support therefor, comprising the steps of depositing refractory metal powder on said support under at the most very slight compacting pressure, pre-sintering the thus deposited refractory metal powder at relatively low temperature in the range of between 1200 degrees C. and 1600 degrees C., machining said pre-sintered powder to form the desired shape of said body, re-sintering the body at a relatively high temperature in the range of between 1700 degrees C. and 2400 degrees C., and impregnating the body with an alkaline-earth salt under predetermined ambient conditions operative for such impregnation.

References Cited by the Examiner

UNITED STATES PATENTS

| | | | |
|---|---|---|---|
| 2,049,811 | 8/1936 | Loewe | 29—25.17 X |
| 2,117,636 | 5/1938 | Tjoflat | 29—25.17 X |
| 2,544,112 | 3/1951 | Schneider | 75—221 |
| 2,663,069 | 12/1953 | Espersen | 29—25.14 |
| 2,675,418 | 4/1954 | Nichols | 75—208 X |
| 2,878,409 | 3/1959 | Levi | 29—25.17 X |

LEON D. ROSDOL, *Primary Examiner.*

L. PEAR, CARL D. QUARFORTH, *Examiners.*

G. A. DOST, R. L. GRUDZIECKI, *Assistant Examiners.*